United States Patent
Minto (10) Patent No.: US 7,721,809 B2
(45) Date of Patent: May 25, 2010

(54) WELLBORE INSTRUMENT MODULE HAVING MAGNETIC CLAMP FOR USE IN CASED WELLBORES

(75) Inventor: James Minto, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/137,748

(22) Filed: Jun. 12, 2008

(65) Prior Publication Data

US 2009/0308617 A1   Dec. 17, 2009

(51) Int. Cl.
*E21B 31/06* (2006.01)
*G21B 23/00* (2006.01)
*G01V 1/40* (2006.01)

(52) U.S. Cl. ............. 166/381; 166/66.5; 181/102

(58) Field of Classification Search ........... 166/66, 166/381, 250.01, 250.11, 382, 66.5; 181/108
See application file for complete search history.

(56) References Cited

U.S. PATENT DOCUMENTS

| | | | |
|---|---|---|---|
| 2,558,427 A * | 6/1951 | Fagan | 73/152.54 |
| 4,953,136 A | 8/1990 | Kamata et al. | |
| 5,044,460 A | 9/1991 | Kamata et al. | |
| 5,212,354 A | 5/1993 | Miller et al. | |
| 5,245,133 A * | 9/1993 | DeCarlo et al. | 174/93 |
| 6,006,855 A * | 12/1999 | Howlett | 181/102 |
| 6,868,035 B2 | 3/2005 | West | |
| 7,048,089 B2 | 5/2006 | West et al. | |
| 7,187,620 B2 | 3/2007 | Nutt et al. | |
| 2003/0117895 A1 * | 6/2003 | Brandsaeter | 367/81 |
| 2008/0211228 A1 * | 9/2008 | Carson | 285/151.1 |

* cited by examiner

*Primary Examiner*—Jennifer H Gay
*Assistant Examiner*—Yong-Suk Ro
(74) *Attorney, Agent, or Firm*—Jonna Flores; Darla Fonseca; Charlotte Rutherford (57) ABSTRACT

A magnetically clamped wellbore instrument module includes a substantially non-magnetic housing configured to traverse an interior of the wellbore. At least one electromagnet is disposed at a longitudinally spaced apart position along the housing. The at least one electromagnet has a plurality of circumferentially spaced apart contact points that define a diameter greater than a diameter of the housing. The contact points have circumferential spaces therebetween defining a diameter smaller than the diameter defined by the contact points.

11 Claims, 6 Drawing Sheets

WELLBORE INSTRUMENT MODULE HAVING MAGNETIC CLAMP FOR USE IN CASED WELLBORES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of wellbore deployed sensors. More specifically, the invention relates to devices for clamping sensors to the wall of a wellbore to provide acoustic and/or mechanical coupling to subsurface formations.

2. Background Art

Wellbore sensors, such as wellbore seismic receivers, are used to detect signals from within wellbores drilled through subsurface formations. Seismic signals, for example, may be naturally occurring, caused by reservoir activity, hydraulic fracturing or a seismic energy source may be deployed at the Earth's surface or in another wellbore to provide seismic energy for a wellbore seismic survey.

An important element of certain types of wellbore sensors, in particular wellbore seismic receivers, is a device to urge the sensor housing into firm contact with the wall of the wellbore. Such urging is important for wellbore seismic receivers so that seismic energy may be efficiently communicated to the wellbore receiver. One type of wellbore seismic receiver is described in U.S. Pat. No. 4,715,469 issued to Yasuda et al. The device used to perform the urging function as described in the Yasuda et al. patent, for example, is typical and includes a "back up arm" that is selectively extensible and retractable from the main body of the receiver housing. When extended, the backup arm urges the housing into contact with the wellbore wall. Other devices known in the art to perform the function of urging the receiver housing against the wall of the wellbore include arched springs and permanent magnets.

The foregoing devices for urging a wellbore sensor housing against the wall of the wellbore either require considerable time to operate, cause increased friction between the receiver and the wellbore wall or both. Friction and deployment time may substantially increase the overall amount of time needed to deploy the sensor in a wellbore, thus reducing efficiency.

There is a need for improved clamping devices for wellbore sensors.

SUMMARY OF THE INVENTION

One aspect of the invention is a magnetically clamped wellbore instrument module. A module according to this aspect of the invention includes a substantially non-magnetic housing configured to traverse an interior of the wellbore. At least one electromagnet is disposed along the housing. The at least one electromagnet has a plurality of circumferentially spaced apart contact points that define a diameter greater than a diameter of the housing. The contact points have circumferential spaces therebetween defining a diameter smaller than the diameter defined by the contact points.

In one example, a first such electromagnet and a such second electromagnet are disposed at a longitudinally spaced apart position along the housing.

Other aspects and advantages of the invention will be apparent from the following description and the appended claims.

DETAILED DESCRIPTION

Figure 1:
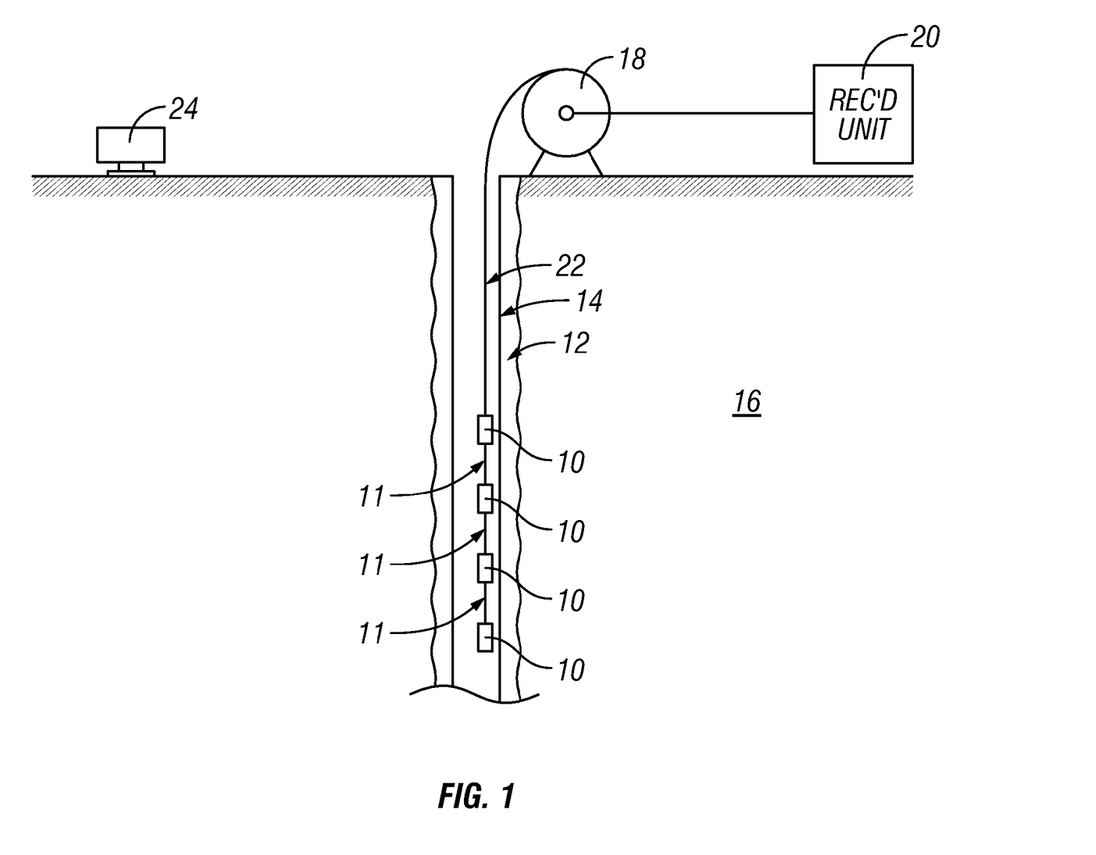
FIG. 1 shows an example wellbore seismic receiver system deployed in a cased wellbore.

An example wellbore sensor system deployed in a wellbore for surveying is shown deployed in a wellbore 12 in FIG. 1. The wellbore 12 has a steel pipe or casing 14 disposed therein. Sensor modules, having magnetic clamping devices as will be explained further below, magnetically couple to the casing 14 using electromagnets. The sensor system may include a plurality of such sensor modules 10 coupled to each other longitudinally using segments 11 of armored electrical cable. An uppermost one of the modules 10 may be coupled to an armored electrical cable 22. The receiver modules 10 may be inserted into the wellbore and withdrawn from the wellbore using the armored electrical cable 22. The cable 22 may be deployed using a winch 18 or similar cable spooling device known in the art. The electrical cable 22 may be electrically coupled to a recording unit 20 deployed at the Earth's surface.

In the present example, the sensor modules 10 may be seismic receiver modules. The recording unit 20 in the present example, may include devices (not shown separately) known in the art for controlling actuation of a seismic energy source 24 such as a vibrator, for controlling operation of the magnetic clamping devices in each module 10, and for receiving and recording seismic signals detected by various sensing devices (not shown separately in FIG. 1) in each sensor module 10. To conduct a seismic survey, the sensor modules 10 are moved to selected positions in the wellbore 12, the magnetic clamping devices in each sensor module 10 are actuated, and the seismic energy source 24 is operated. Seismic signals detected by seismic sensors (not shown in FIG. 1) in each sensor module 10 are either communicated to the recording unit 20, recorded in a data storage device (not shown) in one or more of the modules 10 or elsewhere in the devices deployed within the wellbore 12, or both. After the desired seismic signals have been detected and recorded, the magnetic clamping devices may be switched off, and the modules 10 moved to different positions in the wellbore 12, or they may be withdrawn from the wellbore 12.

It is to be clearly understood that the number of seismic sensor modules shown in the example of FIG. 1 is not a limit on the scope of the present invention. The invention is applicable to one, or any other number of wellbore sensor modules made as will be explained in more detail below. It is also to be clearly understood that the place of deployment of the seismic energy source 24 shown in FIG. 1 is only an example and is not a limit on the scope of the present invention. Deployment of the seismic energy source 24 may be in another, nearby wellbore (not shown). The type of seismic energy source is also not a limit on the scope of the present invention. It is also to be clearly understood that a wellbore seismic receiver according to the invention is not limited to deployment at the end of an electrical cable. Any other device for deployment of a receiver instrument into a wellbore known in the art may also be used, for example, coiled tubing, threadedly coupled tubing drill pipe, slickline and production tubing. Accordingly, conveyance by armored electrical cable is not a limit on the scope of the present invention.

Figure 4:
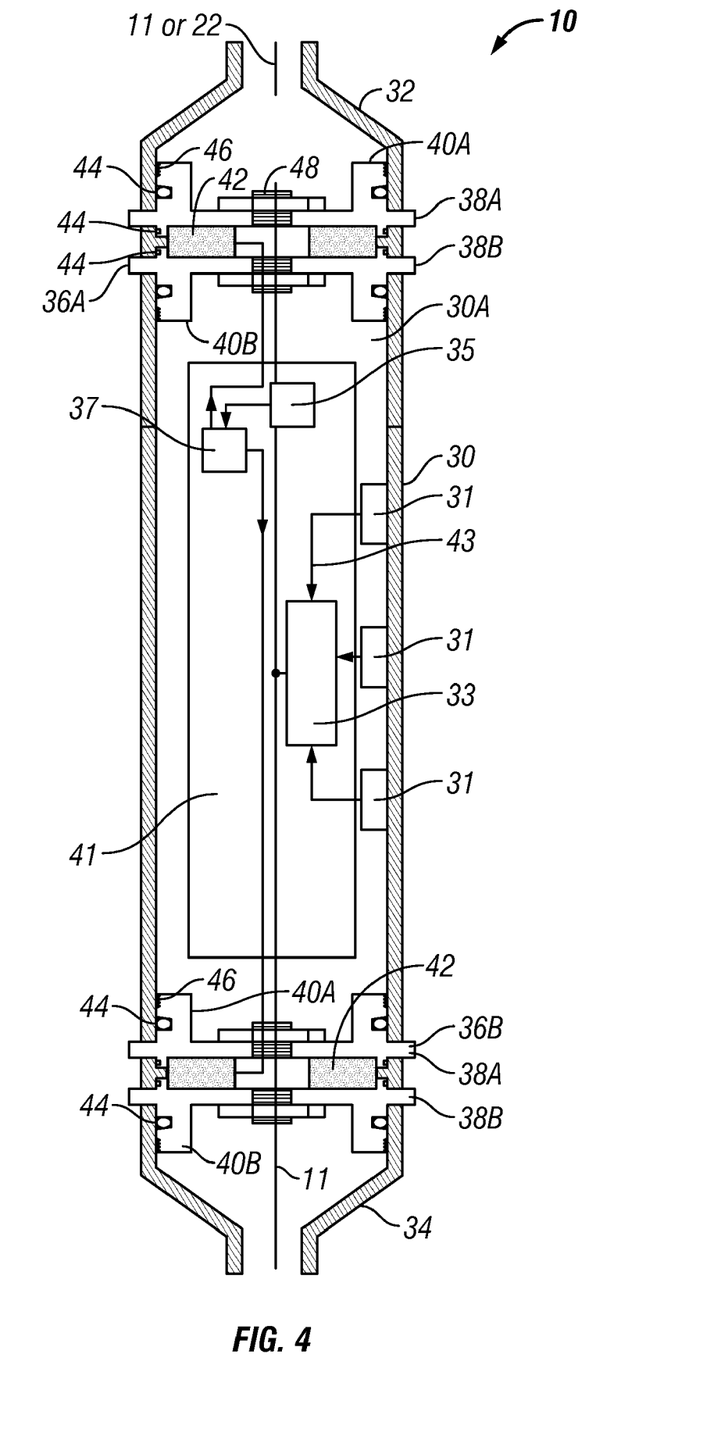
FIG. 4 shows another cross section view of the module shown in FIG. 2.

Having explained the general manner of use of a wellbore sensor according the present invention, one of the modules will now be explained in more detail with reference to FIG. 2. The module 10 may include a substantially non-magnetic, elongated cylindrical housing 30. The housing 30 may be made, for example, from glass or carbon fiber reinforced plastic, or from non-magnetic metal alloy such as stainless steel, monel or an alloy sold under the trademark INCONEL, which is a registered trademark of Huntington Alloys Corporation, Huntington, W.V. The particular material used in any example of the housing 30 will be related to the intended wellbore depth capability of the sensor and how much axial loading must be supported by the housing 30, among other factors. When all the components explained below with reference to FIG. 4 are assembled to the housing, the housing 30 can define a sealed interior chamber (described in more detail below) for enclosing electronic circuitry and seismic sensors, as will be explained in more detail with reference to FIG. 4.

The housing 30 may be coupled to the cable (22 in FIG. 1) or to one of the cable segments (11 in FIG. 1) at its upper end by an upper housing connector 32. The housing 30 may be coupled at its lower end to a cable segment (11 in FIG. 1) or merely capped (terminated), by a lower housing connector 34. The upper 32 and lower 34 housing connectors are also preferably made from a non-magnetic material as explained above with reference to the housing 30. The housing connectors 32, 34 may be coupled to the housing 30 using a particular structure for upper and lower magnetic clamps, 36A, 36B respectively as will be explained below.

The housing 30 may include at least one magnetic clamp made as explained below. The present example includes two such magnetic clamps for reasons set forth below. In the present example, an upper magnetic clamp 36A and a lower magnetic clamp 36B are disposed at spaced apart locations along the housing 30. The magnetic clamps may in some examples be disposed at respective longitudinal ends of the housing 30 as shown in FIG. 2. The magnetic clamps 36A, 36B will be explained below in more detail, but as a general matter, each magnetic clamp 36A, 36B includes an electromagnet that can be selectively switched on or off. Each magnetic clamp 36A, 36B includes a plurality of circumferentially spaced apart pairs of contact points 38 forming part of each pole of each electromagnet. In the present example, the contact points 38 may be longitudinally aligned. The contact points 38 extend laterally outwardly so as to define a diameter that is larger than the diameter of the housing 30. Circumferential spaces 39 between circumferentially adjacent contact points 38 define a generally smaller diameter than that defined by the contact points 38, such that when circumferentially adjacent contact points 38 contact the interior wall of the casing (14 in FIG. 1), the contact points 38 act as contact points between the interior wall of the casing (14 in FIG. 1) and the sensor module 10. The number of circumferentially spaced apart contact points 38 on each magnetic clamp 36A, 36B is a matter of discretion for the system designer, however it is contemplated that the magnetic clamps will work well for seismic sensing purposes if there are three or more such circumferentially spaced apart contact points on each of the upper magnetic clamp 36A and the lower magnetic clamp 36B.

In the present example, the upper magnetic clamp 36A and the lower magnetic clamp 36B are rotationally oriented such that the contact points 38 of the upper magnetic clamp 36A are in the same circumferential position relative to the housing 30 as the spaces 39 on the lower magnetic clamp 36B, and vice versa. Thus, when the magnetic clamps 36A, 36B are actuated, two circumferentially adjacent contact points 38 of either the upper 36A or lower 36B magnetic clamp will make contact with the wall of the casing (14 in FIG. 1) by magnetic attraction and one contact point 38 of the other magnetic clamp 36B, 36A will contact the wall of the casing (14 in FIG. 1). Such arrangement will provide three points of contact between the housing 30 and the wall of the casing (14 in FIG. 1). In the present example, there are four circumferentially spaced apart pairs of contact points 38 on each of the upper 36A and lower 36B magnetic clamps. Thus, the contact points are circumferentially spaced apart by about 90 degrees. The contact points of the upper 36A and lower 36B magnetic clamps in such case may be angularly displaced with respect to each other by about 45 degrees. In other examples having a different number of circumferentially spaced apart contact points, the angular displacement between the upper and lower magnetic clamps may be about one-half the angular displacement between circumferentially spaced apart contact points on each magnetic clamp (or 180 degrees divided by the number of contact points on each magnetic clamp).

In other examples, the upper 36A and lower 36B magnetic clamps may be rotationally aligned, such that the contact points 38 on each of the upper 36A and lower 36B magnetic clamps define lines parallel to the longitudinal axis of the housing 30. In such examples, when the upper 36A and lower magnetic 36B clamps are actuated, four pairs of contact points 38 will contact the interior wall of the casing (14 in FIG. 1).

Figure 2:
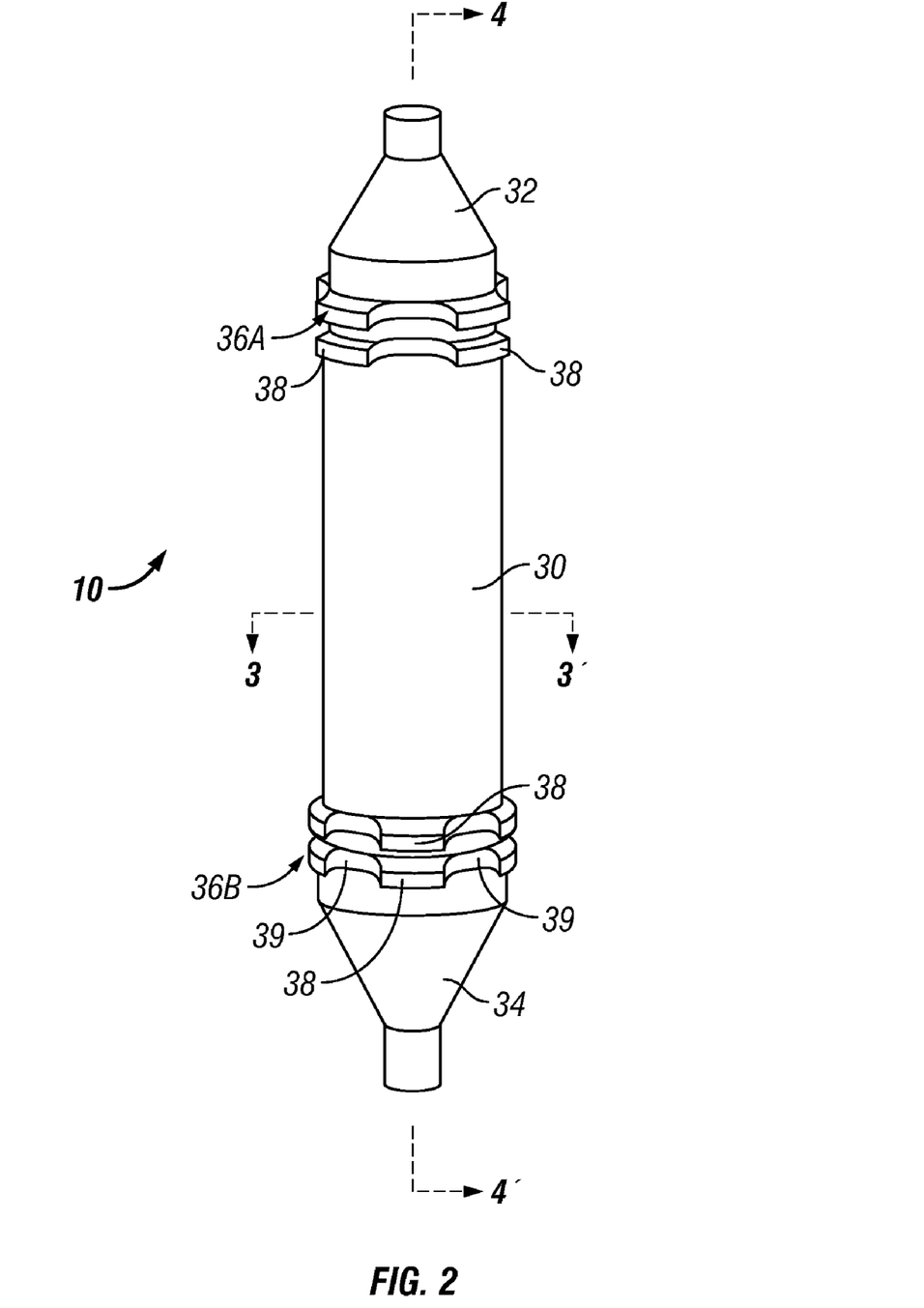
FIG. 2 shows an oblique view of one of the receiver modules shown in FIG. 1.
Figure 3:
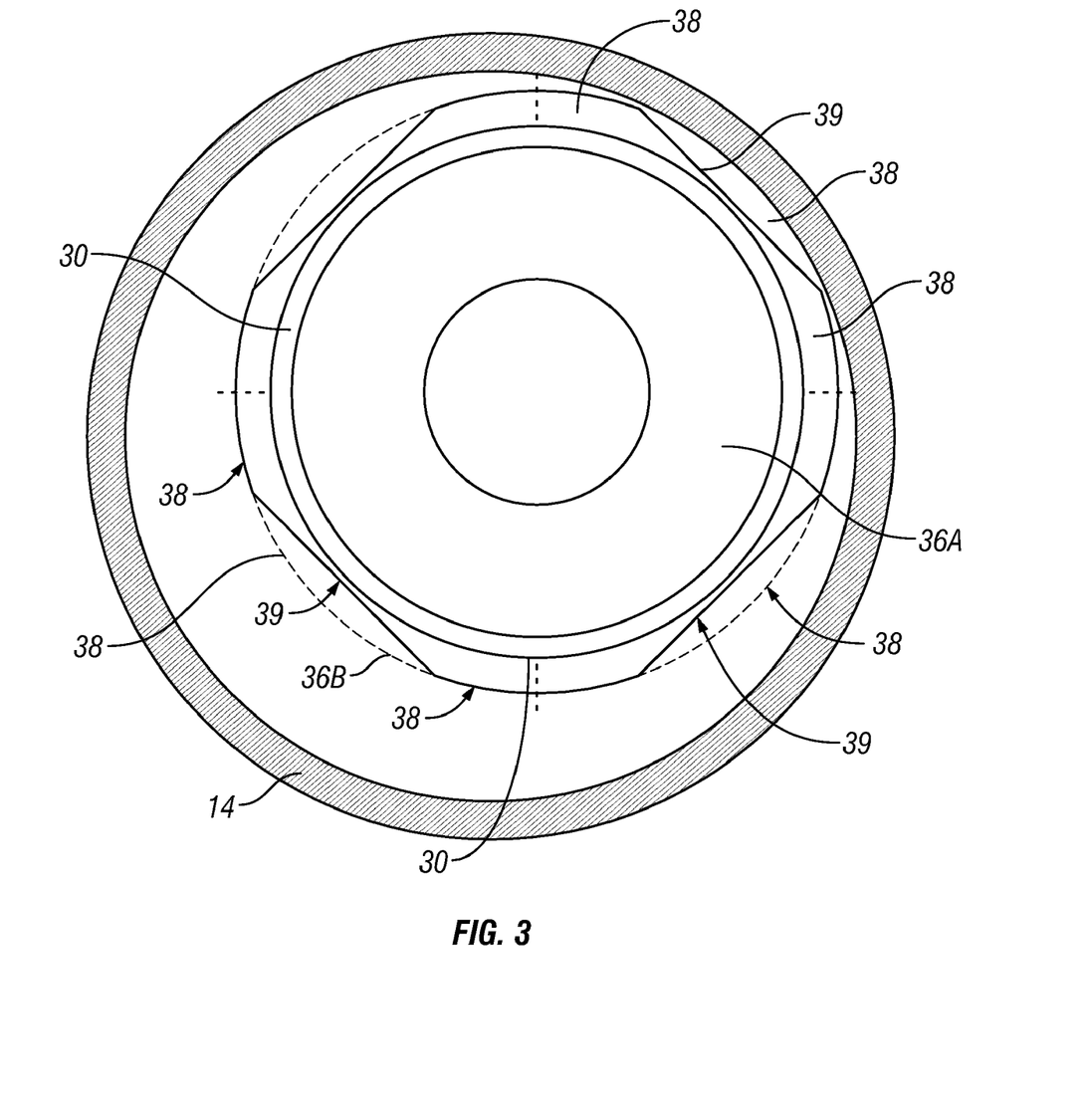
FIG. 3 shows a cross section through the module shown in FIG. 2.

FIG. 3 shows a cross sectional view of the sensor module 10 shown in FIG. 2 to illustrate the manner of contact between the magnetic clamps and the casing. FIG. 3 shows the upper magnetic clamp 36A using solid lines, and selected portions of the lower magnetic clamp 36B using dashed lines. What can be observed in FIG. 3 are two circumferentially adjacent pairs of contact points 38 on the upper magnetic clamp 36A making contact with the interior wall of the casing 14, while one pair of contact points 38 on the lower magnetic clamp 36B makes such contact. By using the arrangement of circumferentially spaced apart contact points and angular displacement between the upper 36A and lower 36B magnetic clamps as explained above, irrespective of the orientation of the housing 30 within the casing 14, when the magnetic clamps 36A and 36B are actuated, the magnetic clamps 36A 36B will be arranged to cause three point contact with the casing 14 by the magnetic force created in the magnetic clamps 36A, 36B.

Figure 6:
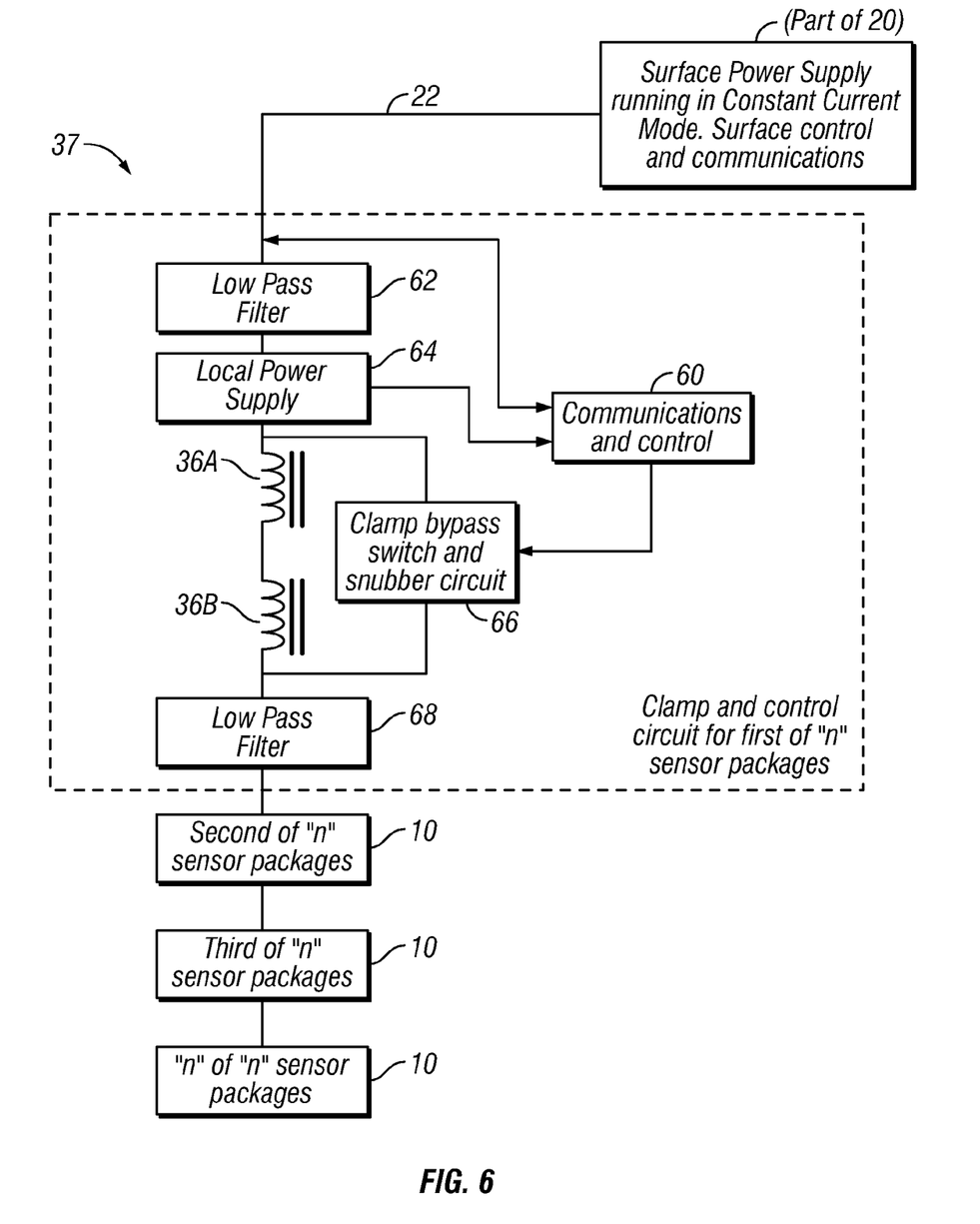
FIG. 6 shows example control and operating circuitry for the clamping device shown in FIG. 5.

FIG. 4 shows a cut away view of an example interior of the housing 30 showing an example structure for the magnetic clamps 36A, 36B as well as example sensors and circuitry. As explained above, the housing 30 may define a sealed interior chamber 30A in which may be disposed the various active components of the sensor module 10. In the present example, there may be three seismic sensors 31 disposed in the chamber 30A. The seismic sensors 31 may be geophones, accelerometers, or any other seismic sensor known in the art responsive to particle motion, although the particular type of seismic or other sensor is not a limitation on the scope of the present invention. The seismic sensors 31 may be mutually orthogonally oriented, or may have other orientation known in the art for detecting components of seismic energy moving in different direction and mode of motion. The seismic sensors 31 may generate electrical and/or optical signals in response to detected seismic energy. Signals from the seismic sensors 31 may be conducted to a signal processor 33 disposed on a circuit board 41 or boards disposed within the chamber 30A. The configuration of the signal processor 33 is a matter of discretion for the designer of a system and is not intended to limit the scope of the present invention. Signals from the processor 33 may be stored locally in a data storage device (not shown) disposed on or about the circuit board(s) 41, and/or may be conducted to a telemetry circuit 35 for transmission to the recording unit (20 in FIG. 1). A local power supply/controller 37, explained below in more detail with reference to FIG. 6, provides electrical current to windings 42 in each of the upper magnetic clamp 36A and lower magnetic clamp 36B when it is desired to operate the magnetic clamps 36A, 36B.

The contact points 38 are shown in FIG. 4 as including upper contact points 38A and lower contact points 38B. The upper contact points 38A can form part of an upper pole frame 40A, and the lower contact points 38B can form part of a lower pole frame 40B. The upper and lower pole frames 40A and 40B are connected together by a center pole 49 which completes the magnetic circuit between the upper and lower contact points 38A and 38B. In the present example, the pole frames 40A, 40B and the center pole 49 may be formed from ferromagnetic material such as steel, or magnetic stainless steel to reduce harmful effects of corrosion. The previously mentioned windings 42 may be disposed around the center pole 49, for example wound so that the planes of the turns are perpendicular to the longitudinal axis of the housing 30, such that when electric current is passed through the windings 42, the pole frames 40A, 40B are magnetized as opposed poles of an electromagnet. The contact points 38A, 38B act as corresponding poles of the electromagnet with respect to the casing (14 in FIG. 1).

The pole frames 40A, 40B may be sealed against the interior of the housing 30 using o-rings 44 or similar sealing device. The upper 40A and lower 40B pole frames may be held in relative position with respect to each other using the center pole 49, which preferably has a central opening therein to enable passage of electrical and/or optical conductors through each module 10.

Figure 5:
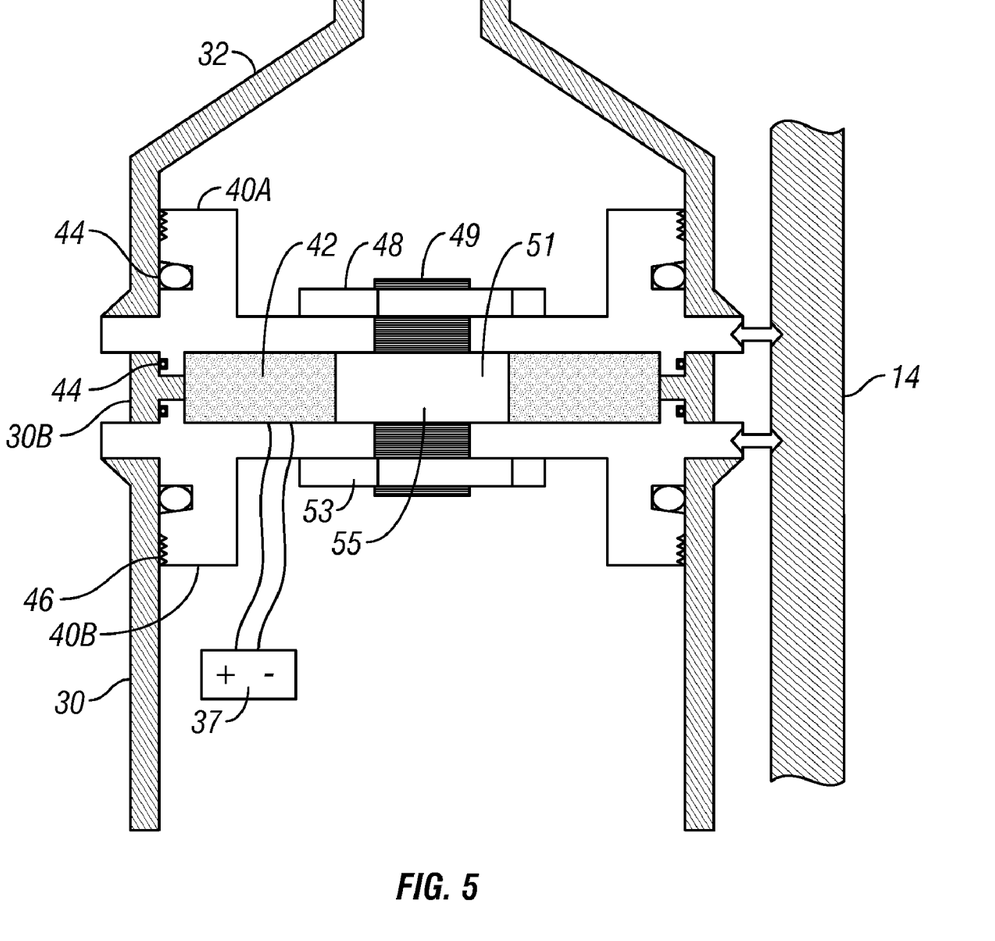
FIG. 5 shows an example clamping device in detail.

The upper magnetic clamp 36A is shown in more detail in cross sectional view in FIG. 5. The upper 40A and lower 40B pole frames may couple to the housing 30 using threads 46 or similar device for joining. The pole frames 40A, 40B may, as previously explained, seal against the interior of the housing 30 using o-rings 44 or the like. A longitudinal space between the pole frames 40A, 40B may be covered with non-magnetic material sleeve 30B which may be made from the same material used for the housing 30 or may be made from a different substantially non-magnetic material. The center pole 49 may be threaded on each end and threaded connectors 48 and 53 may be used to provide the capability for the magnetic clamp 36 to transfer axial loading from the upper connector 42 to the housing 30 while maintaining longitudinal separation between the pole frames 40A, 40B. The center pole 49 may define a passage 51 to enable electrical and/or optical conductors to extend through the module 10. An example of the power supply 37 is shown in more detail in FIG. 6. Electrical power to operate the sensor system may be provided by the recording unit (20 in FIG. 1) as explained above. The electrical power may be provided along one or more electrical conductors in the cable 22. Typically, electrical power is provided along the cable 22 as direct current. The recording unit (20 in FIG. 1) may include devices (not shown separately) for generating command signals to be communicated along the cable 22. Such signals may include commands to actuate and/or deactivate the magnetic clamps. The command signals may be conducted to a controller 60 (which may be disposed on the one or more circuit boards shown at 41 in FIG. 4). Upon detection of a command to actuate the magnetic clamps, the controller 60 may cause a bypass switch 66 to open, and direct current to flow to the windings in the magnetic clamps 36A, 36B. A first low pass filter 62 may be provided to avoid conducting the control signals to the power converter 64. A second low pass filter 68 may be provided at the lower end of the local power supply 37 so that the command signals may be freely communicated to any number of additional modules 10 coupled below the uppermost module (such as shown in FIG. 1).

A wellbore sensor made according to the invention may be quickly deployed in a wellbore, engaged to contact a casing at a selected depth therein, and quickly disengaged from the casing to enable movement to a different depth in the wellbore. A wellbore sensor made according to the invention may have improved reliability as compared with devices known in the art including back up arms because the sensor module includes essentially no moving parts.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A magnetically clamped wellbore instrument module, comprising:
    a substantially non-magnetic housing configured to traverse an interior of the wellbore;
    at least a first electromagnet and a second electromagnet disposed along the housing, each electromagnet having a plurality of circumferentially spaced apart contact points that define a diameter greater than a diameter of the housing, the contact points having circumferential spaces therebetween defining a diameter smaller than the diameter defined by the contact points;
    wherein the contact points of at least first and second electromagnets are rotationally aligned with respect to each other, thereby defining lines parallel to the longitudinal axis of the non-magnetic housing upon activation of the first and second electromagnets.

2. The module of claim 1 wherein the electromagnets comprise a pair of longitudinally spaced apart pole frames formed from ferromagnetic material and a winding disposed about the pole frames such that the contact points on each of the pair of pole frames acts as respective pole of the electromagnet.

3. The module of claim 2 further comprising a center pole disposed through the pair of pole frames, the center pole configured to maintain longitudinal separation of the pole frames and to transfer axial loading between the pole frames.

4. The module of claim 3 wherein the pole frames define an internal longitudinal passage therethrough.

5. The module of claim 1 wherein the housing includes a connector at each longitudinal end configured to connect to an armored electrical cable.

6. The module of claim 1 further comprising at least one seismic sensor disposed in the housing.

7. A method for clamping an instrument module, said instrument module comprising a housing and a sensor, to an interior wall of a wellbore casing, comprising:

moving the instrument module to a selected position within the wellbore casing; and actuating at least a first electromagnet and a second electromagnet, each electromagnet having a plurality of circumferentially spaced apart contact points that define a diameter greater than a diameter of the housing, the contact points having circumferential spaces therebetween defining a diameter smaller than the diameter defined by the contact points;

wherein the contact points on the first electromagnet and the second electromagnet are rotationally aligned with respect to each other, thereby defining lines parallel to the longitudinal axis of the non-magnetic housing upon activation of the first and second electromagnets.

8. The method of claim 7 wherein the at least a first electromagnet comprises a pair of longitudinally spaced apart pole frames formed from ferromagnetic material and a winding disposed about a center of the pole frames such that the contact points on each of the pair of pole frames acts as one pole of a magnet.

9. The method of claim 7 wherein the pole frames define an internal longitudinal passage therethrough.

10. The method of claim 7 wherein the moving comprises spooling an armored electrical cable.

11. The method of claim 7 further comprising detecting seismic energy using the sensor.

* * * * *